(12) United States Patent
Watarai et al.

(10) Patent No.: US 9,783,180 B2
(45) Date of Patent: Oct. 10, 2017

(54) BANJO FITTING INCLUDING SEAL RUPTURING STRUCTURE AND HYDRAULIC HOSE COUPLING ASSEMBLY INCLUDING SAME

(71) Applicant: Shimano, Inc., Sakai-shi, Osaka (JP)

(72) Inventors: Etsuyoshi Watarai, Sakai (JP); Osamu Kariyama, Sakai (JP); Nobuyoshi Fujii, Sakai (JP); Masahiro Nakakura, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 15/017,316

(22) Filed: Feb. 5, 2016

(65) Prior Publication Data
US 2017/0225669 A1 Aug. 10, 2017

(51) Int. Cl.
*F16L 27/00* (2006.01)
*B60T 17/04* (2006.01)
*B62L 1/10* (2006.01)
*B62L 3/02* (2006.01)

(52) U.S. Cl.
CPC .............. *B60T 17/043* (2013.01); *B62L 1/10* (2013.01); *B62L 3/023* (2013.01)

(58) Field of Classification Search
USPC ..................... 285/273, 3, 190, 191
See application file for complete search history.

(56) References Cited

U.S. PATENT DOCUMENTS

| 1,725,286 | A | * | 8/1929 | Loughead | ............. | F16L 33/213 |
| | | | | | | 285/258 |
| 4,626,006 | A | * | 12/1986 | Noguchi | ................. | B60T 17/04 |
| | | | | | | 285/143.1 |
| 4,927,190 | A | * | 5/1990 | Nishikawa | .............. | B23P 15/00 |
| | | | | | | 285/148.13 |
| 6,619,700 | B2 | * | 9/2003 | Kacines | ................ | F16L 27/093 |
| | | | | | | 285/190 |
| 2003/0042737 | A1 | * | 3/2003 | Sampson | .............. | F16B 39/108 |
| | | | | | | 285/190 |
| 2004/0245772 | A1 | * | 12/2004 | Swim | ..................... | F16B 35/041 |
| | | | | | | 285/190 |
| 2007/0182156 | A1 | * | 8/2007 | Petrykowski | ......... | F16L 41/005 |
| | | | | | | 285/190 |
| 2011/0215567 | A1 | * | 9/2011 | Hurwitz | .................. | F16D 1/072 |
| | | | | | | 285/256 |

* cited by examiner

*Primary Examiner* — Aaron Dunwoody
(74) *Attorney, Agent, or Firm* — Alleman Hall Creasman & Tuttle LLP

(57) ABSTRACT

A banjo fitting is provided that may include an annular portion with an internal bore that extends along a first axis, and a hose attachment portion that extends radially from the annular portion, and has an internal fluid passageway extending along a second axis formed at an angle to the first axis. A seal rupturing structure may be positioned within the internal fluid passageway of the hose attachment portion.

19 Claims, 5 Drawing Sheets

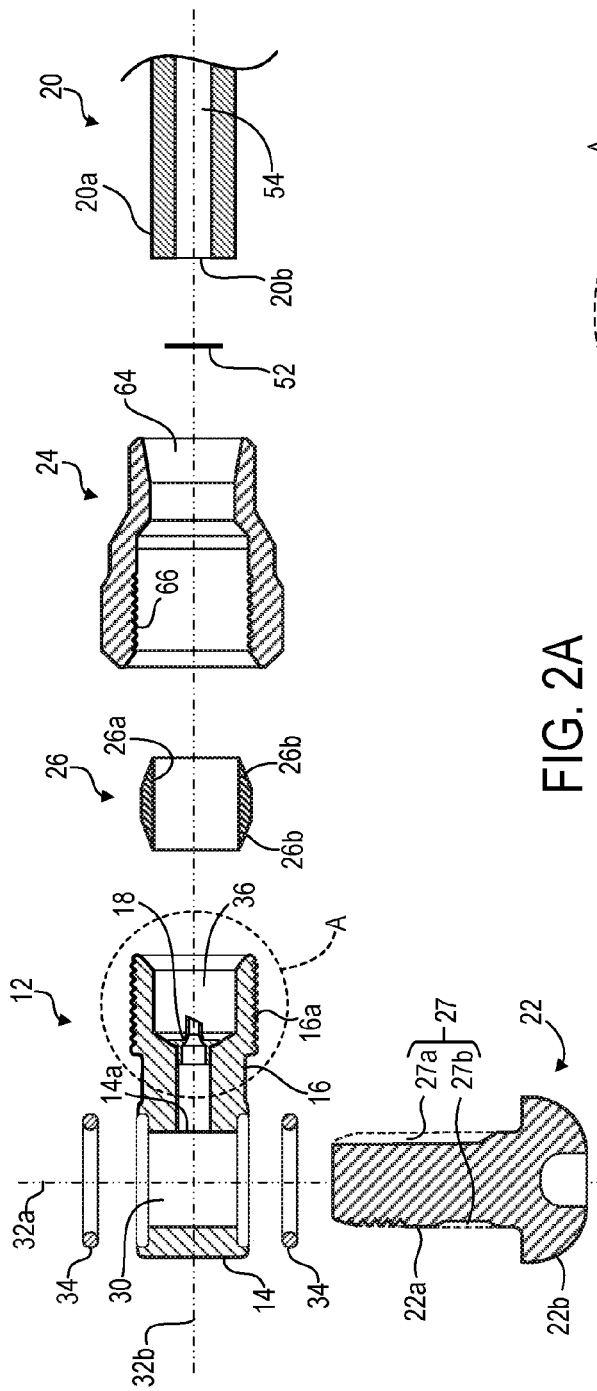
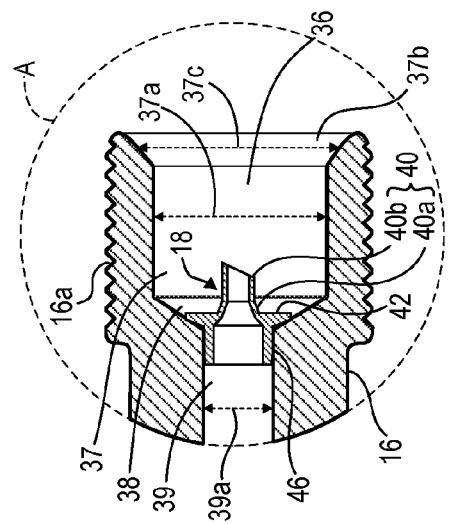
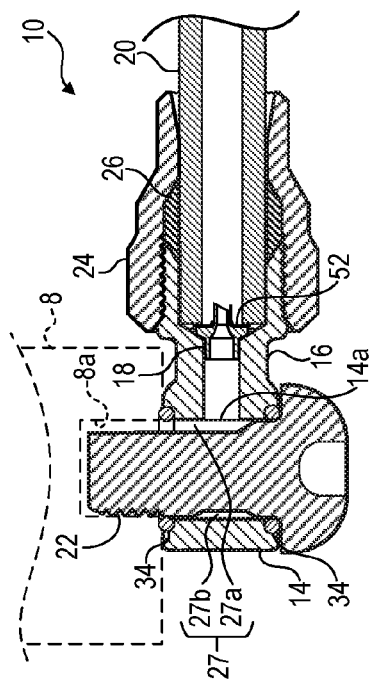
FIG. 2A
FIG. 2B
FIG. 2C

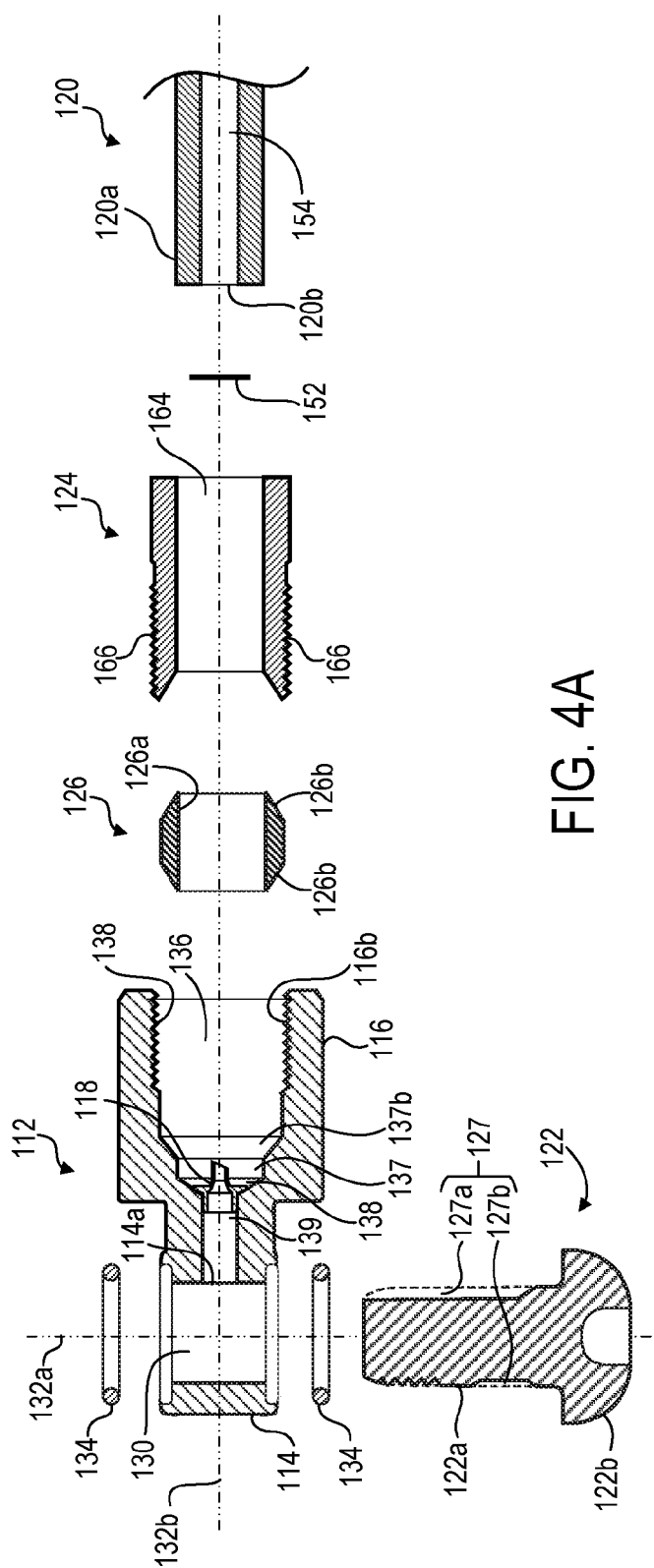
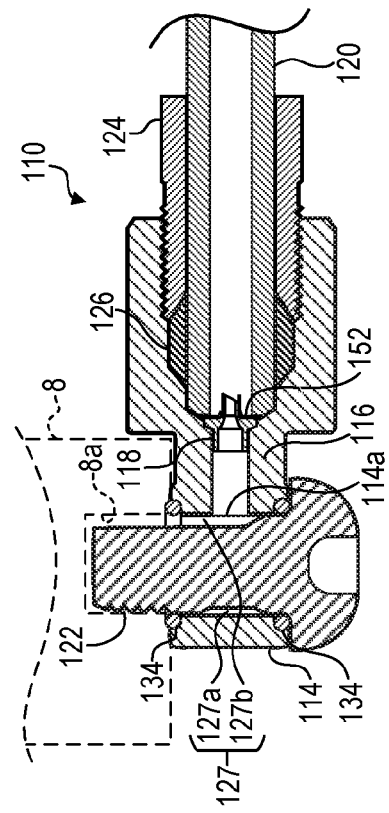
FIG. 4A
FIG. 4B

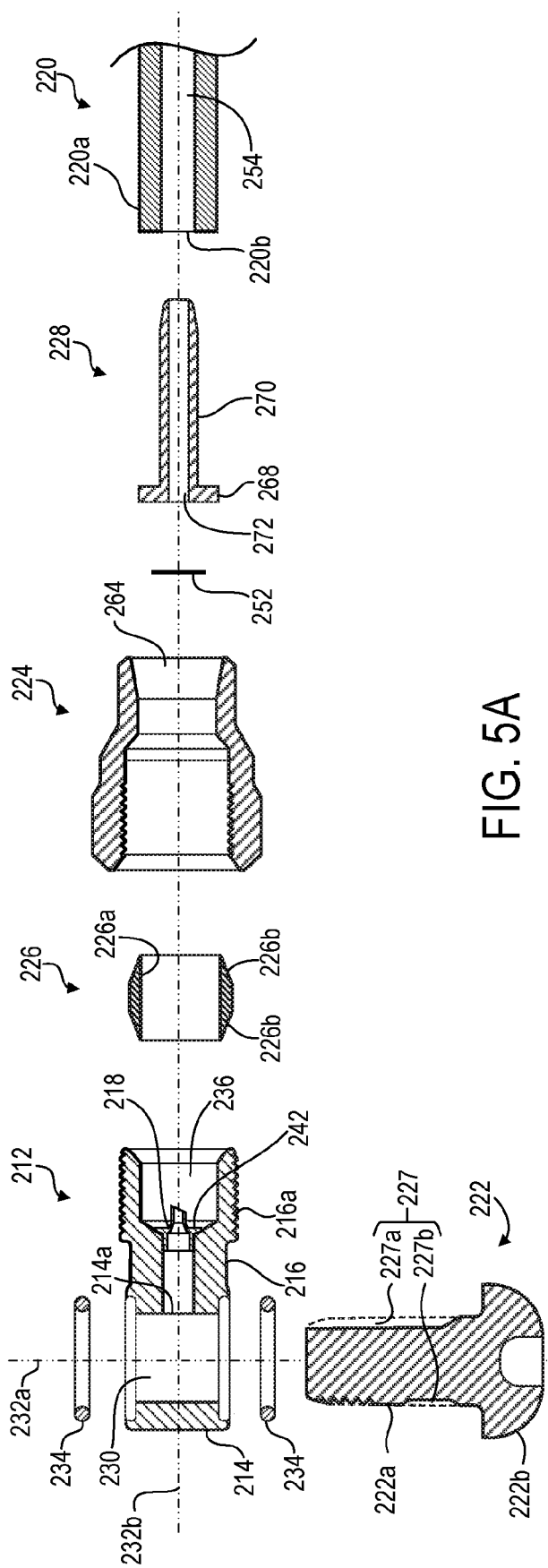
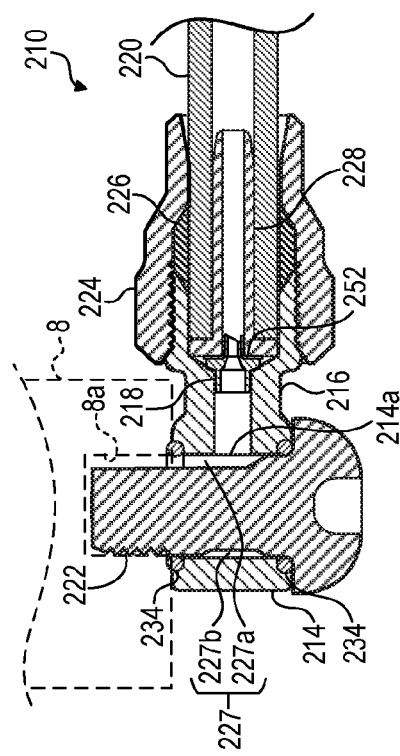
FIG. 5A
FIG. 5B

BANJO FITTING INCLUDING SEAL RUPTURING STRUCTURE AND HYDRAULIC HOSE COUPLING ASSEMBLY INCLUDING SAME

BACKGROUND

A typical hydraulic brake system for a bicycle has a brake lever that is fluidly coupled to a hydraulic brake caliper assembly by a hydraulic brake hose. Hydraulic fluid pressure is transmitted to the hydraulic brake caliper assembly in response to operation of the brake lever. Trapped air within the hydraulic brake hose may lead to a spongy feeling.

SUMMARY

To address the above issues, a banjo fitting for a hydraulic hose coupling assembly is provided. According to a first aspect of the disclosure, a banjo fitting is provided comprising an annular portion with an internal bore that extends along a first axis, and a hose attachment portion that extends radially from the annular portion, and has an internal fluid passageway extending along a second axis formed at an angle to the first axis. A seal rupturing structure is positioned within the internal fluid passageway of the hose attachment portion. The potential advantages of this configuration are that the annular portion of the banjo fitting may allow for rotation of the banjo fitting around the first axis, and the hose attachment portion with the seal rupturing structure may allow for a hydraulic hose coupling assembly to be assembled while inhibiting air from becoming trapped in a hydraulic brake system.

In a second aspect based on the first aspect, the seal rupturing structure may be configured to be formed separately from the hose attachment portion, and coupled to the hose attachment portion. One potential advantage of this configuration is that the seal rupturing structure and the hose attachment portion of the banjo fitting can be manufactured separately.

In a third aspect based on the first through second aspects, the seal rupturing structure may be configured to have a cylindrical shape to allow fluid flow through the seal rupturing structure. One potential advantage of this configuration is that it may allow fluid to flow unimpeded from one side of the seal rupturing structure to the other.

In a fourth aspect based on the first through third aspects, the seal rupturing structure may be configured to include a needle portion. One potential advantage of this configuration is that may allow the seal rupturing structure to puncture a seal.

In a fifth aspect based on the fourth aspect, the needle portion may be configured to have a proximal end, and a beveled distal end opposite to the proximal end, and the seal rupturing structure may be configured to include a flange portion provided on the proximal end of the needle portion. One potential advantage of this configuration is that the flange portion may securely retain the seal rupturing structure relative to a seal that the beveled distal end of the seal rupturing structure ruptures.

In a sixth aspect based on the fifth aspect, the internal fluid passageway may be configured to have a first diameter portion, a second diameter portion having a smaller diameter than the first diameter portion, and a step portion provided between the first and second diameter portions. The seal rupturing structure may be configured to include an insertion portion formed to be inserted in the second diameter portion of the internal fluid passageway, and the insertion portion may be configured to extend from the proximal end of the needle portion. The potential advantages of this configuration are that it may allow a banjo fitting with a seal rupturing structure formed separately from a hose attachment portion to be easily assembled, and it may allow the seal rupturing structure to be securely retained within the internal fluid passageway of the hose attachment portion.

In a seventh aspect based on the first through sixth aspects, the seal rupturing structure may be configured to be formed of a different material than the hose attachment portion. One potential advantage of this configuration is that the seal rupturing structure and the hose attachment portion can be formed of materials configured with ideal properties for their separate functions.

In an eighth aspect based on one of the first, third and fourth aspects, the seal rupturing structure may be configured to be formed integrally with the hose attachment portion. One potential advantage of this configuration is that the seal rupturing structure would be unable to move relative to the hose attachment portion, and therefore the seal rupturing structure would stay stationary if the seal rupturing structure encounters repetitive or strong forces.

In a ninth aspect, a hydraulic hose coupling assembly is provided that comprises a banjo fitting, a hydraulic hose, and a banjo bolt. The banjo fitting includes an annular portion with an internal bore that extends along a first axis, and a hose attachment portion that extends radially from the annular portion. The hose attachment portion has an internal fluid passageway that extends along a second axis formed at an angle to the first axis. The banjo fitting includes a seal rupturing structure that is positioned within the internal fluid passageway of the hose attachment portion. The hydraulic hose has a first end portion with a first opening and a seal that seals the first opening. The hydraulic hose is configured such that the seal of the hydraulic hose is physically ruptured by the seal rupturing structure as the hydraulic hose is coupled to the hose attachment portion. Coupling causes fluid communication between an interior of the hydraulic hose and the internal fluid passageway. The banjo bolt is configured to be installed within the internal bore of the annular portion, and configured with a hydraulic passageway. The potential advantages of this configuration are that the annular portion of the banjo fitting allows for rotation of the banjo fitting around the banjo bolt, and the hydraulic hose coupling assembly can be assembled in a relatively easy manner while inhibiting air from being trapped in the hydraulic brake system, therefore improving performance of the hydraulic brake system.

In a tenth aspect based on the ninth aspect, the banjo bolt may be configured to be coupled to a hydraulic brake caliper assembly. The potential advantages of this configuration are that a hydraulic hose can be quickly attached to a hydraulic brake caliper assembly without spilling hydraulic fluid due to the orientation of the hydraulic hose during assembly and without allowing air to enter the hydraulic brake system.

In an eleventh aspect based on the ninth or tenth aspect, the hydraulic hose coupling assembly may be configured such that the internal fluid passageway of the hose attachment portion has a bushing receiving portion and a hose receiving portion, and an interior diameter of the bushing receiving portion is larger than an interior diameter of the hose receiving portion. The hydraulic hose coupling assembly may be configured to further comprise a threaded fitting. The threaded fitting may include a longitudinal bore with the first end portion of the hydraulic hose disposed therein, and a threaded portion that may be configured to threadingly engage one of an internal threaded portion or an external threaded portion of the hose attachment portion. The hydraulic hose coupling assembly may also be configured to further comprise a deformable tubular bushing disposed around the first end portion of the hydraulic hose, where the deformable tubular bushing may be positioned between the bushing receiving portion of the internal fluid passageway and the treaded fitting such that the deformable tubular bushing may decrease in axial length along the second axis and decrease in radial width, in response to engagement of the threaded fitting with one of the internal threaded portion or the external threaded portion of the hose attachment portion. The potential advantages of this configuration are that the deformation of the deformable tubular bushing acts to both secure the hydraulic hose within the hose attachment portion as well as form a watertight seal between the hydraulic hose and the deformable tubular bushing, and that the threaded fitting enables securement of the components of the hydraulic hose coupling assembly so that they are inhibited from becoming loose or coming apart during normal wear associated with use of a bicycle, which could cause leakage of hydraulic fluid or breakage of the system.

In a twelfth aspect based on the ninth through eleventh aspects, the hydraulic hose may be configured to include a tubular insert provided on the first end portion and within the first opening. One potential advantages of this configuration is that the tubular insert may provide radial support to a hydraulic hose.

In a thirteenth aspect based on the ninth through twelfth aspects, the tubular insert may be configured to have a tubular portion, an annular flange portion provided on an end of the tubular portion, and a longitudinal passageway within the tubular portion. The seal may be configured to be attached to the annular flange portion. One potential advantage of this configuration is that a conventional hydraulic hose can be used with the banjo fitting of this disclosure and a seal can be coupled to a hydraulic hose via a tubular insert, where the annular flange portion secures the tubular insert against an annular end face of the hydraulic hose.

In a fourteenth aspect based on the ninth through thirteenth aspects, the seal rupturing structure may be configured to be formed separately from the hose attachment portion, and coupled to the hose attachment portion. One potential advantage of this configuration is that that the seal rupturing structure and the hose attachment portion of the banjo fitting can be manufactured separately.

In a fifteenth aspect based on the ninth through fourteenth aspects, the seal rupturing structure may be configured to have a cylindrical shape to allow fluid flow through the seal reputing structure. One potential advantage of this configuration is that it allows fluid to flow unimpeded from one side of the seal rupturing structure to the other.

In a sixteenth aspect based on the ninth through fifteenth aspects, the seal rupturing structure may be configured to include a needle portion. One potential advantage of this configuration is that it may allow the seal rupturing structure to puncture a seal.

In a seventeenth aspect based on the sixteenth aspect, the needle portion may be configured to have a proximal end, and a beveled distal end opposite to the proximal end. The seal rupturing structure may be configured to include a flange portion provided on the proximal end of the needle portion. One potential advantage of this configuration is that the flange portion may securely retain the seal rupturing structure relative to a seal that the beveled distal end of the seal rupturing structure ruptures.

In a eighteenth aspect based on the seventeenth aspect, the internal fluid passageway may be configured to have a first diameter portion, a second diameter portion having a smaller diameter than the first diameter portion, and a step portion provided between the first and second diameter portions. The seal rupturing structure may be configured to include an insertion portion formed to be inserted in the second diameter portion of the internal fluid passageway, and the insertion portion may be configured to extend from the proximal end of the needle portion. The potential advantages of this configuration are that it may allow a banjo fitting with a seal rupturing structure formed separately from a hose attachment portion to be easily assembled, and it may allow the seal rupturing structure to be securely retained within the internal fluid passageway of the hose attachment portion.

In a nineteenth aspect based on the ninth through eighteenth aspects, the seal rupturing structure may be configured to be formed of a different material than the hose attachment portion. One potential advantage of this configuration is that the seal rupturing structure and the hose attachment portion can be formed of materials configured with suitable properties for their separate functions, and binding between like materials can be avoided. Further, manufacturing processes can be simplified by forming each as a separate part and assembling the separate parts, rather than machining or casting a single complex part, which could increase production costs.

In a twentieth aspect based on the ninth through thirteenth, fifteenth, and sixteenth aspects, the seal rupturing structure may be configured to be formed integrally with the hose attachment portion. One potential advantage of this configuration is that the integral structure inhibits the seal rupturing structure from moving relative to the hose attachment portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2A-2C are cross-sectional views of a hydraulic hose coupling assembly in accordance with the first embodiment of the present disclosure;

FIGS. 4A-4B are a cross-sectional views of a hydraulic hose coupling assembly in accordance with the second embodiment of the present disclosure, shown unassembled and assembled; and FIGS. 5A-5B are a cross-sectional views of a hydraulic hose coupling assembly in accordance with the third embodiment of the present disclosure, shown unassembled and assembled.

DETAILED DESCRIPTION

Selected embodiments of the present disclosure will now be described with reference to the accompanying drawings. It will be apparent to those skilled in the art from this disclosure that the following descriptions of the embodiments of the invention are provided for illustration only and not for the purpose of limiting the invention as defined by the appended claims and their equivalents.

Figure 1:
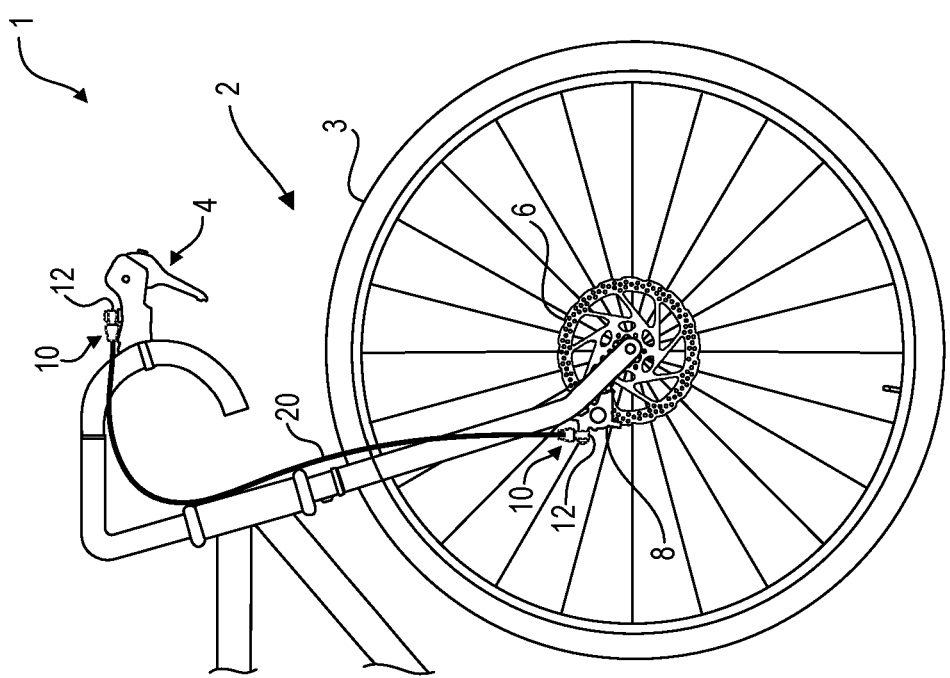
FIG. 1 is a side elevational view of a front half of a bicycle having a hydraulic brake system wherein a hydraulic hose coupling assembly couples a hydraulic hose to a hydraulic brake caliper assembly.

Referring initially to FIG. 1, a bicycle 1 is illustrated with a hydraulic brake system 2, including a hydraulic brake actuation device 4 operatively connected to a hydraulic brake caliper assembly 8 configured to engage a brake disk 6 to slow rotation of a wheel 3 to which the brake disk 6 is mounted in response to actuation of the hydraulic brake actuation device 4. To operatively connect the hydraulic brake actuation device 4 to the hydraulic brake caliper assembly 8, a hydraulic hose coupling assembly 10 is provided that includes a banjo fitting 12 and a hydraulic hose 20 securable therein as described below. The hydraulic hose 20 extends between the hydraulic brake actuation device 4 and the hydraulic brake caliper assembly 8, and contains hydraulic fluid therein. Hydraulic fluid pressure is transmitted from the hydraulic brake actuation device 4 to the hydraulic brake caliper assembly 8 via the hydraulic fluid in the hydraulic hose 20. In this manner, when a rider actuates the hydraulic brake actuation device 4, the hydraulic brake caliper assembly 8 is caused to grip the brake disk 6 to slow rotation of the wheel 3.

The banjo fitting 12 of the hydraulic hose coupling assembly 10 is typically provided on the hydraulic brake caliper assembly 8, but may alternatively or in addition be provided on the hydraulic brake actuation device 4. The hydraulic hose coupling assembly 10 and banjo fitting 12 of the present disclosure are useful in particular during installation of the hydraulic hose 20, since they can be used to install a sealed hose with hydraulic fluid therein in a manner that inhibits air from becoming entrained therein.

Although only the front portion of the bicycle 1 is depicted in FIG. 1, it should be understood from the drawings and the description herein that the bicycle 1 includes both a front and a rear wheel, and that a respective hydraulic brake system 2 including one or more respective hydraulic hose coupling assemblies 10 and banjo fittings 12 may be installed in each of the front and rear wheels. Since features of both front and rear brake systems are the same, description of rear portions of the bicycle and rear portions of the hydraulic brake system are omitted for the sake of brevity.

In FIGS. 2A-2C and 3, a first embodiment of a hydraulic hose coupling assembly 10 is illustrated. The hydraulic hose coupling assembly 10 includes a banjo fitting 12, a hydraulic hose 20, a banjo bolt 22, a threaded fitting 24, a deformable tubular bushing 26.

Figure 3:
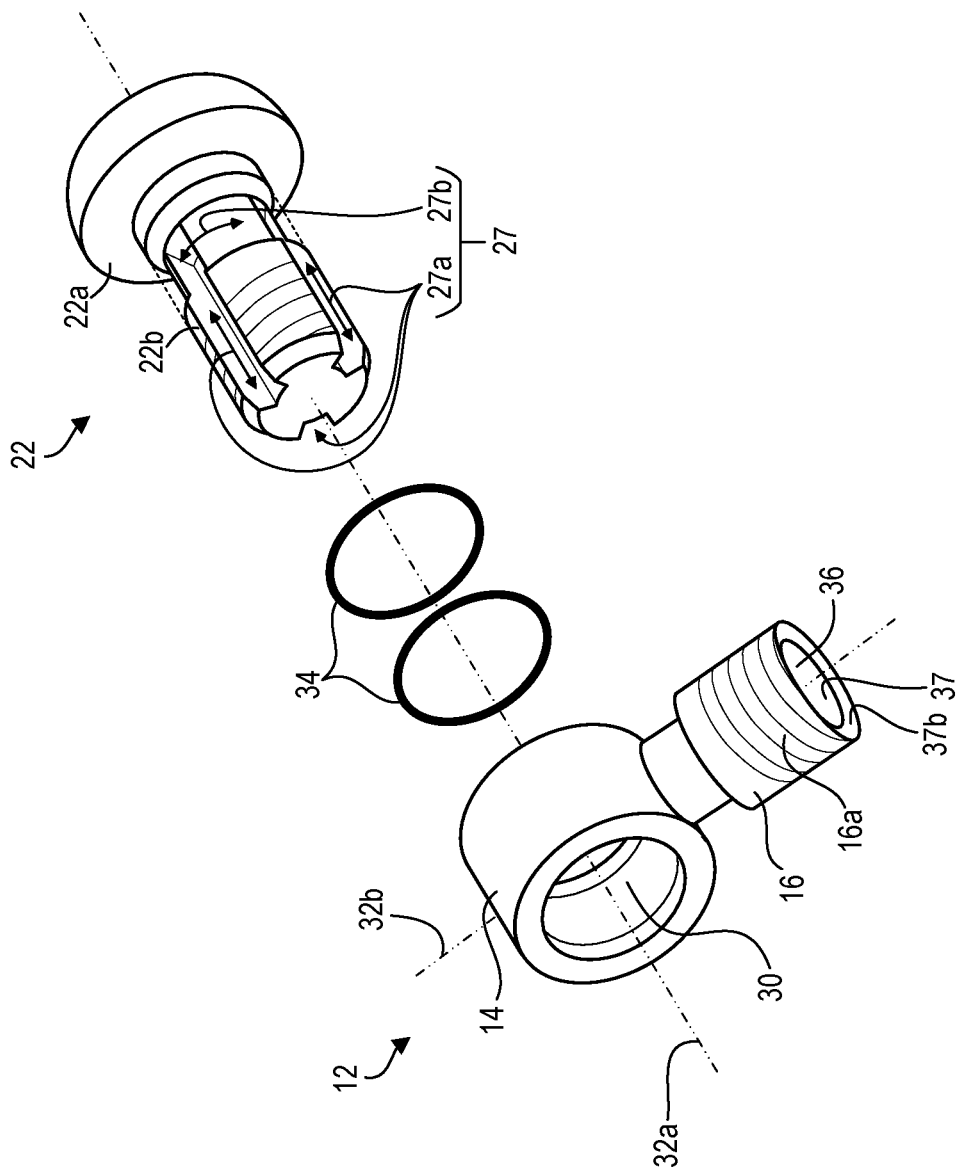
FIG. 3 is an exploded view of a hydraulic hose coupling assembly, showing a banjo bolt and a banjo fitting with a seal rupturing structure in accordance with the first embodiment.

The banjo bolt 22 is an elongated member that is configured to be coupled to the hydraulic brake caliper assembly 8, and attach the hydraulic hose coupling assembly 10 to the hydraulic brake caliper assembly 8, while also fluidly coupling the hydraulic hose coupling assembly 10 to the hydraulic brake caliper assembly 8. The banjo bolt 22 includes a body having a shaft portion 22a and a cap portion 22b. The shaft portion 22a is typically threaded, as shown in FIG. 3, and configured to threadingly engage a threaded hole 8a in the hydraulic brake caliper assembly 8. The shaft portion 22a includes at least one hydraulic passageway 27 extending therethrough. The hydraulic passageway 27 includes one or more longitudinal subpassageways 27a extending along a longitudinal axis of the banjo bolt 22, and an annular passageway 27b fluidly connecting each of the longitudinal subpassageways 27a. In the embodiment illustrated in FIG. 3, three longitudinal subpassageways 27a are shown in the form of external flutes formed at respective positions equilaterally about a first axis 32a. It will be appreciated that other forms are possible, such as an internal bore that replaces the annular passageway 27b or the externally fluted longitudinal subpassageways 27a. Further, a different number (e.g., 1, 2, or 4 or more) of longitudinal subpassageways 27a may be provided.

As shown in FIGS. 2A, 2B, and 3, the banjo fitting 12 of the hydraulic hose coupling assembly 10 includes an annular portion 14, a hose attachment portion 16, and a seal rupturing structure 18 within the hose attachment portion 16.

The annular portion 14 of the banjo fitting 12 may have a cylindrical, polygonal, or curvilinear shape with an internal bore 30 that extends along a first axis 32a of the banjo fitting 12. The internal bore 30 of the annular portion 14 is may be longer in the first axis 32a than it is in diameter along a second axis 32b. The relatively longer length in the first axis 32a helps provide sufficient room for both the annular passageway 27b of the banjo bolt 22 and the surrounding regions of the shaft portion 22a of the banjo bolt 22 with a larger outer diameter that contact the inner wall of the internal bore 30, while the reduced diameter along the second axis 32b helps the overall size of the top and bottom surface of the hydraulic hose coupling assembly 10 remain compact. The banjo bolt 22 is configured to be installed within the internal bore 30 of the annular portion 14, where an inner surface of the annular portion 14 extends rotatably around the banjo bolt 22 enabling the rest of the hydraulic hose coupling assembly 10 to be pivoted relative to the banjo bolt 22 when the banjo bolt 22 is secured. Furthermore, when the banjo bolt 22 is installed in the annular portion 14 of the banjo fitting 12, the hydraulic passageway 27 of the banjo bolt 22 is open on one end of the banjo bolt 22 (i.e., at distal ends of the longitudinal subpassageways 27a) to the hydraulic brake caliper assembly 8, and open at the other end (i.e., adjacent a portion of annular passageway 27b) to an opening 14a in an inner surface of the annular portion 14 of the banjo fitting 12, which is fluidly coupled to the internal fluid passageway 36 of the hose attachment portion 16. When assembled, the banjo bolt 22 is also configured to direct the flow of hydraulic fluid between the hydraulic hose coupling assembly 10 and the hydraulic brake caliper assembly 8. The internal bore 30 of the annular portion 14 may include recesses or concave annular shaped grooves that retain a pair of sealing rings 34. Further, annular axial end faces of the annular portion 14 of the banjo fitting 12 may be coated with a friction resistant material so as to improve retention.

The hose attachment portion 16 extends radially from the annular portion 14 of the banjo fitting 12 and is integrally formed as a one piece element with the annular portion 14 in the illustrated embodiments, although a two-piece construction may be possible. The hose attachment portion 16 extends along the second axis 32b of the banjo fitting 12, formed at an angle to the first axis 32a of the banjo fitting 12.

An internal fluid passageway 36 extends along the second axis 32b of the banjo fitting 12 and passes through the entire length of the hose attachment portion 16, with the seal rupturing structure 18 positioned within the internal fluid passageway 36. It will be appreciated that the length of the internal fluid passageway 36 may be substantially longer than the hydraulic passageway 27 that extends along a longitudinal axis of the banjo bolt 22, which achieves the potential advantage of improving the strength of the hydraulic hose attachment. Referring to FIG. 2C, the internal fluid passageway 36 has a first diameter portion 37, a second diameter portion 39 having an interior diameter 39a smaller than the first diameter portion 37, and a step portion 38 provided between the first diameter portion 37 and second diameter portion 39. The seal rupturing structure 18 includes an insertion portion 46 formed to be inserted in the second diameter portion 39 of the internal fluid passageway 36.

The seal rupturing structure 18 may have a cylindrical shape to allow fluid flow through the seal rupturing structure 18, so that the portions of the internal fluid passageway 36 on each side of the seal rupturing structure 18 are in fluid communication. The seal rupturing structure 18 includes a needle portion 40 on the side of the internal fluid passageway 36 containing the first diameter portion 37. The needle portion 40 has a proximal end 40a, and a beveled distal end 40b opposite to the proximal end 40a. The seal rupturing structure 18 also includes a flange portion 42 provided on the proximal end 40a of the needle portion 40. The insertion portion 46 extends from the proximal end 40a of the needle portion 40.

The hydraulic hose 20 illustrated in FIGS. 2A and 2B, for example, may be a flexible tube that is used for conveying hydraulic fluid from a hydraulic brake actuation device to the hydraulic hose coupling assembly 10 under pressure, and may be manufactured of a polymer material. The hydraulic hose 20 has a first end portion 20a with a first opening 20b and a seal 52 that seals the first opening 20b before the hydraulic hose coupling assembly 10 is assembled. The seal 52 is formed of a thin flexible sheet of metal foil, or a suitable similar material. The seal 52 is adhesively attached to an axial end surface of the first end portion 20a of the hydraulic hose 20 to overlie the first opening 20b of the hydraulic hose 20. Thus, the seal 52 forms a seal that seals the first opening 20b of the hydraulic hose 20. The sealed hydraulic hose typically contains hydraulic fluid therein, prior to the assembly process.

When the hydraulic hose coupling assembly 10 is assembled, the hydraulic hose 20 is coupled to the hose attachment portion 16 of the banjo fitting 12. The seal 52 prevents fluid communication between the banjo fitting 12 and the interior 54 of the hydraulic hose 20 until the seal 52 is ruptured by the seal rupturing structure 18. As further seen in FIGS. 2B and 2C, the hydraulic hose 20 is configured such that the seal 52 of the hydraulic hose 20 is ruptured or punctured by the seal rupturing structure 18. In particular, the seal 52 is physically ruptured by the seal rupturing structure 18 in response to the first end portion 20a of the hydraulic hose 20 being fully inserted, i.e. coupled, to the hose attachment portion 16 of the banjo fitting 12. The seal 52 is configured to be easily ruptured by the seal rupturing structure 18. Coupling the first end portion 20a of the hydraulic hose 20 to the hose attachment portion 16 of the banjo fitting 12 causes fluid communication between an interior 54 of the hydraulic hose 20 and the internal fluid passageway 36.

Referring to FIGS. 2B and 2C, the needle portion 40 of the seal rupturing structure 18 is formed for rupturing or puncturing the seal 52. In particular, the beveled distal end 40b of the needle portion 40 punctures the seal 52 and is inserted into a first opening 20b of the hydraulic hose 20 in response to the first end portion 20a of the hydraulic hose 20 being fully inserted into the hose attachment portion 16 of the banjo fitting 12. When the first end portion 20a of the hydraulic hose 20 is coupled to the hose attachment portion 16, the flange portion 42 of the seal rupturing structure 18 is pushed against an annular end face of the hydraulic hose 20, with the seal 52 disposed in between, which securely retains the seal rupturing structure 18 relative to the first opening 20b of the hydraulic hose 20. The outer surface of the insertion portion 46 of the seal rupturing structure 18 is fitted to the inner surface of the second diameter portion 39 of the hose attachment portion 16. The insertion portion 46 of the seal rupturing structure 18 is configured to be retained in the second diameter portion 39.

The seal rupturing structure 18 may comprise a resin material such as a plastic, although any suitable rigid material may be utilized for the seal rupturing structure 18 as needed and/or desired. In the preferred embodiment, the seal rupturing structure 18 is formed separately from the hose attachment portion 16 of a different material than the hose attachment portion 16, and coupled to the hose attachment portion 16. However, it should be appreciated that in alternative embodiments, the seal rupturing structure 18 could be formed integrally with the hose attachment portion 16, or formed separately from the hose attachment portion 16 of the same material as the hose attachment portion 16.

When the hydraulic hose coupling assembly 10 is assembled and the seal 52 is ruptured, the hydraulic passageway 27 of the banjo bolt 22, the internal fluid passageway 36 of the hose attachment portion 16 of the banjo fitting 12, and the interior 54 of the hydraulic hose 20 are fluidly coupled to form a first fluid path when the hydraulic hose 20 is coupled to the hose attachment portion 16 of the banjo fitting 12. By preventing coupling of the interior 54 of the hydraulic hose 20 to the internal fluid passageway 36 of the hose attachment portion 16, this configuration achieves the potential advantages of reducing the risk of air from being trapped in the hydraulic brake system, as well as minimizing the leakage of hydraulic fluid, during assembly of the hydraulic hose 20 to the hydraulic hose coupling assembly 10, therefore improving performance of the hydraulic brake system.

As seen in FIGS. 2A and 2B, a threaded fitting 24 has a longitudinal bore with the first end portion 20a of the hydraulic hose 20 and the deformable tubular bushing 26 disposed therein while the hydraulic hose coupling assembly 10 is assembled. The threaded fitting 24 has a threaded portion 66 configured to threadingly engage an external threaded portion 16a of the hose attachment portion 16 of the banjo fitting 12. The threaded fitting 24 is configured to secure the hydraulic hose 20 within the hose attachment portion 16 upon rotational engagement of the threads of the threaded portion 66 with the threads of the external threaded portion 16a of the hose attachment portion 16.

The deformable tubular bushing 26 has an inner surface 26a and a pair of annular inclined surfaces 26b. While the hydraulic hose coupling assembly 10 is assembled, the deformable tubular bushing 26 is disposed around the first end portion 20a of the hydraulic hose 20, and one of the pair of annular inclined surfaces 26b is positioned within an bushing receiving portion 37b of the internal fluid passageway 36 of the hose attachment portion 16. The internal fluid passageway 36 has a bushing receiving portion 37b and a hose receiving portion (a first diameter portion) 37, and an interior diameter 37c of the bushing receiving portion 37b is larger than an interior diameter 37a of the hose receiving portion 37. The deformable tubular bushing 26 is positioned between the bushing receiving portion 37b of the internal fluid passageway 36 and the threaded fitting 24 such that one of the pair of annular inclined surfaces 26b comes into contact with a surface of the bushing receiving portion 37b of the internal fluid passageway 36 and the other one of the pair of annular inclined surfaces 26*b* comes into contact with the threaded fitting 24 upon threaded engagement of threaded portion 66 of the threaded fitting 24 with the external threaded portion 16*a* of the hose attachment portion 16.

The deformable tubular bushing 26 is configured to be deformed during threaded engagement of the threaded fitting 24 with the banjo fitting 12. In particular, the deformable tubular bushing 26 decreases in axial length along the second axis 32*b* and decreases in radial width as the deformable tubular bushing 26 deforms in response to engagement of the threaded fitting 24 with the external threaded portion 16*a* of the hose attachment portion 16. As a result, the deformable tubular bushing 26 is deformed so as to squeeze the first end portion 20*a* of the hydraulic hose 20, and secure the hydraulic hose 20 within the internal fluid passageway 36 of the hose attachment portion 16 of the banjo fitting 12. The deformable tubular bushing 26 may comprise a rigid material such as metal. For example, the deformable tubular bushing 26 may comprise a copper or a copper alloy, although any suitable rigid material may be utilized for the deformable tubular bushing 26 as needed and/or desired.

Referring to WIGS. 4A and 4B, a hydraulic hose coupling assembly 110 is provided according to a second embodiment of the present disclosure. Since the hydraulic hose coupling assembly 110 is generally similar to that of the first embodiment with the exception of the threading of the hose attachment portion 116 and the threaded fitting 124, detailed description thereof is abbreviated here for the sake of brevity. It is to be noted that like parts are designated by like reference numerals throughout the detailed description and the accompanying drawings.

As shown in FIG. 4A, the hose attachment portion 116 of the banjo fitting 112 can also be provided with an internal threaded portion or bore 116*b*. In this embodiment, the threaded fitting 124 is configured to threadingly engage the internal threaded portion 116*b* of the hose attachment portion 116. Accordingly, the threaded portion 166 of the threaded fitting 124 is disposed on an external surface of the threaded fitting 124, instead of on an internal surface, as seen with the first embodiment.

The widest point of the internal fluid passageway 136 of the hose attachment portion 116 is elongated along the second axis 132*b* to accommodate the internal threaded portion 116*b*, but the hose receiving portion 137 (a first diameter portion) of the internal fluid passageway 136 is shortened in the second axis 132*b*.

Similar to the previous embodiment, the deformable tubular bushing 126 is positioned so that one of the pair of annular inclined surfaces 126*b* comes in to contact with a surface of the bushing receiving portion 137*b* of the internal fluid passageway 136 and the other one of the pair of annular inclined surfaces 126*b* comes into contact with the threaded fitting 124 upon threaded engagement of the threaded fitting 124 with the internal threaded portion 116*b* of the hose attachment portion 116. The deformable tubular bushing 126 disposed therebetween. The threaded fitting 124 of this embodiment is also configured to secure the hydraulic hose 120 within the hose attachment portion 116 by deforming the deformable tubular bushing 126 so as to squeeze the first end portion 120*a* of the hydraulic hose 120, and secure the hydraulic hose 120 within the internal fluid passageway 136 of the hose attachment portion 116 upon rotational engagement of the threads of the threaded portion 166 with the threads of the internal threaded portion 116*b* of the hose attachment portion 116. For all other aspects of this embodiment of the hydraulic hose coupling assembly, the configuration reflects the primary embodiment of the present disclosure.

As seen in FIGS. 5A and 5B, a hydraulic hose coupling assembly 210 is provided according to a third embodiment of the present disclosure. Since the hydraulic hose coupling assembly 210 is generally similar to that of the first embodiment with the exception of the presence of a tubular insert 228, detailed description thereof is abbreviated here for the sake of brevity. In this embodiment, the hydraulic hose 220 includes a tubular insert 228 provided on a first end portion 220*a* and within a first opening 220*b* of the hydraulic hose 220. The tubular insert 228 has a tubular portion 270 and an annular flange portion 268 provided on an end of the tubular portion 270. A longitudinal passageway 272 passes through within the tubular portion 270 and the annular flange portion 268. The seal 252 is attached to an annular flange portion 268 of the tubular insert 228. The outer surface of the tubular portion 270 may have a plurality of inclined barbs such that the tubular portion 270 is securely retained in the interior 254 of the hydraulic hose 220. The tubular insert 228 is configured to be retained in the first end portion 220*a* of the hydraulic hose 220 and to provide radial support at the first end portion 220*a* of the hydraulic hose 220 while the deformable tubular bushing 226 squeezes the first end portion 220*a* of the hydraulic hose 220 in response to threaded engagement of the threaded fitting 224 with the hose attachment portion 216 of the banjo fitting 212. Accordingly, the tubular insert 228 comprises a rigid material, such as a metallic material. For example, the tubular insert 228 may comprise a copper or a copper alloy, although any suitable rigid material may be utilized for the tubular insert 228 as needed and/or desired.

When the tubular insert 228, installed to the first end portion 220*a* of the hydraulic hose 220, is coupled to the hose attachment portion 216 of the banjo fitting 212, the flange portion 242 of the seal rupturing structure 218 is pushed against the annular flange portion 268 of the tubular insert 228, with the seal 252 disposed therebetween, which securely retains the seal rupturing structure 218 relative to the longitudinal passageway 272 of the tubular insert 228. The needle portion 240 of the seal rupturing structure 218 is configured to rupture the seal 252, and to be retained in the longitudinal passageway 272 of the tubular insert 228. When the hydraulic hose coupling assembly 210 is assembled and the seal 252 is ruptured, the hydraulic passageway 227 of the banjo bolt 222, the internal fluid passageway 236 of the hose attachment portion 216, the longitudinal passageway 272, and the interior 254 of the hydraulic hose 220 are fluidly coupled to form a first fluid path.

Although FIGS. 5A and 5B depicts the tubular insert 228 in a hydraulic hose coupling assembly 210 in which the a hose attachment portion 216 of a banjo fitting 212 has an external threaded portion 216*a*, it should be obvious to one skilled in the art that the tubular insert 228 could be implemented in numerous embodiments, including one in which the hose attachment portion 216 of the banjo fitting 212 has an internal threaded portion. For all other aspects of this embodiment of the hydraulic hose coupling assembly, the configuration reflects the primary embodiment of the present disclosure.

While specific embodiments of the hydraulic hose coupling assembly have been described in detail, the particular arrangements disclosed are meant to be illustrative only and not limiting. The features of the various embodiments described above, as well as modifications thereof, may be variously combined without departing from the scope of this disclosure.

The invention claimed is:

1. A banjo fitting for a hydraulic hose coupling assembly, comprising:
   an annular portion with an internal bore that extends along a first axis;
   a hose attachment portion, extending radially from the annular portion, and having an internal fluid passageway extending along a second axis formed at an angle to the first axis; and
   a seal rupturing structure positioned within the internal fluid passageway of the hose attachment portion, wherein
   the internal fluid passageway of the hose attachment portion has a bushing receiving portion and a hose receiving portion, and an interior diameter of the bushing receiving portion is larger than an interior diameter of the hose receiving portion, the hydraulic hose coupling assembly further comprising:
   a threaded fitting including:
      a longitudinal bore with a first end portion of a hydraulic hose disposed therein, and
      a threaded portion configured to threadingly engage one of an internal threaded portion or an external threaded portion of the hose attachment portion, and
   a deformable tubular bushing disposed around the first end portion of the hydraulic hose, the deformable tubular bushing being positioned between the bushing receiving portion of the internal fluid passageway and the threaded fitting such that the deformable tubular bushing decreases in axial length along the second axis and decreases in radial width, in response to engagement of the threaded fitting with one of the internal threaded portion or the external threaded portion of the hose attachment portion.

2. The banjo fitting of claim 1, wherein
   the seal rupturing structure is formed separately from the hose attachment portion, and coupled to the hose attachment portion.

3. The banjo fitting of claim 2, wherein
   the seal rupturing structure has a cylindrical shape to allow fluid flow through the seal rupturing structure.

4. The banjo fitting of claim 3, wherein
   the seal rupturing structure includes a needle portion.

5. The banjo fitting of claim 4, wherein
   the needle portion has a proximal end, and a beveled distal end opposite to the proximal end, and
   the seal rupturing structure includes a flange portion provided on the proximal end of the needle portion.

6. The banjo fitting of claim 5, wherein
   the internal fluid passageway has a first diameter portion, a second diameter portion having a smaller diameter than the first diameter portion, and a step portion provided between the first and second diameter portions,
   the seal rupturing structure includes an insertion portion formed to be inserted in the second diameter portion of the internal fluid passageway, and
   the insertion portion extends from the proximal end of the needle portion.

7. The banjo fitting of claim 2, wherein
   the seal rupturing structure is formed of a different material than the hose attachment portion.

8. The banjo fitting of claim 1, wherein
   the seal rupturing structure is formed integrally with the hose attachment portion.

9. A hydraulic hose coupling assembly, comprising:
   a banjo fitting including:
      an annular portion with an internal bore that extends along a first axis;
      a hose attachment portion, extending radially from the annular portion, and having an internal fluid passageway extending along a second axis formed at an angle to the first axis;
      a seal rupturing structure positioned within the internal fluid passageway of the hose attachment portion;
   a hydraulic hose having a first end portion with a first opening and a seal that seals the first opening, the hydraulic hose being configured such that the seal of the hydraulic hose is physically ruptured by the seal rupturing structure as the hydraulic hose is coupled to the hose attachment portion; and
   a banjo bolt, installed within the internal bore of the annular portion, and configured with a hydraulic passageway, wherein
   the internal fluid passageway of the hose attachment portion has a bushing receiving portion and a hose receiving portion, and an interior diameter of the bushing receiving portion is larger than an interior diameter of the hose receiving portion, the hydraulic hose coupling assembly further comprising:
   a threaded fitting including:
      a longitudinal bore with the first end portion of the hydraulic hose disposed therein, and
      a threaded portion configured to threadingly engage one of an internal threaded portion or an external threaded portion of the hose attachment portion, and
   a deformable tubular bushing disposed around the first end portion of the hydraulic hose, the deformable tubular bushing being positioned between the bushing receiving portion of the internal fluid passageway and the threaded fitting such that the deformable tubular bushing decreases in axial length along the second axis and decreases in radial width, in response to engagement of the threaded fitting with one of the internal threaded portion or the external threaded portion of the hose attachment portion.

10. The hydraulic hose coupling assembly of claim 9, wherein:
    the banjo bolt is coupled to a hydraulic brake caliper assembly.

11. The hydraulic hose coupling assembly of claim 9, wherein
    the hydraulic hose includes a tubular insert provided on the first end portion and within the first opening.

12. The hydraulic hose coupling assembly of claim 11, wherein
    the tubular insert has a tubular portion, an annular flange portion provided on an end of the tubular portion, and a longitudinal passageway within the tubular portion, and
    the seal is attached to the annular flange portion.

13. The hydraulic hose coupling assembly of claim 9, wherein
    the seal rupturing structure is formed separately from the hose attachment portion, and coupled to the hose attachment portion.

14. The hydraulic hose coupling assembly of claim 13, wherein
    the seal rupturing structure has a cylindrical shape to allow fluid flow through the seal reputing structure.

15. The hydraulic hose coupling assembly of claim 14, wherein
the seal rupturing structure includes a needle portion.

16. The hydraulic hose coupling assembly of claim 15, wherein
the needle portion has a proximal end, and a beveled distal end opposite to the proximal end, and
the seal rupturing structure includes a flange portion provided on the proximal end of the needle portion.

17. The hydraulic hose coupling assembly of claim 16, wherein
the internal fluid passageway has a first diameter portion, a second diameter portion having a smaller diameter than the first diameter portion, and a step portion provided between the first and second diameter portions,
the seal rupturing structure includes an insertion portion formed to be inserted in the second diameter portion of the internal fluid passageway, and
the insertion portion extends from the proximal end of the needle portion.

18. The hydraulic hose coupling assembly of claim 13, wherein
the seal rupturing structure is formed of a different material than the hose attachment portion.

19. The hydraulic hose coupling assembly of claim 9, wherein
the seal rupturing structure is formed integrally with the hose attachment portion.

\* \* \* \* \*